March 3, 1931. D'ORSAY McC. WHITE 1,794,660
CONDENSER FOR STEAM PROPELLED VEHICLES
Filed Oct. 5, 1929
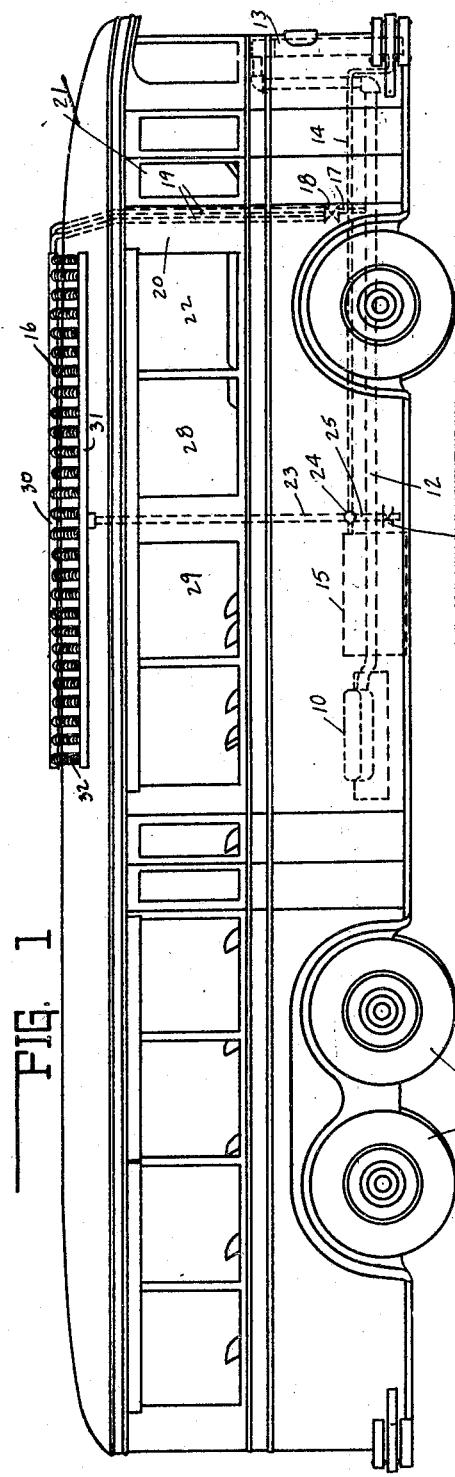
INVENTOR.
D'ORSAY McCALL WHITE.
BY Lockwood, Lockwood,
Goldsmith & Galt
ATTORNEYS.

Patented Mar. 3, 1931

1,794,660

UNITED STATES PATENT OFFICE

D'ORSAY McCALL WHITE, OF INDIANAPOLIS, INDIANA, ASSIGNOR TO AUTOMOTIVE SYNDICATE, LTD., OF INDIANAPOLIS, INDIANA, A TRUST OF MICHIGAN

CONDENSER FOR STEAM-PROPELLED VEHICLES

Application filed October 5, 1929. Serial No. 397,601.

This invention relates to a condenser arrangement for steam propelled vehicles and particularly for passenger-carrying vehicles for use in public service transportation. In such vehicles it is important that sufficient condenser capacity be provided to condense the exhaust steam from the propelling engines and conserve the same for repeated use.

The principal feature of the present invention resides in the novel arrangement of condensers.

Another feature resides in the connections between the said condensers whereby increased condenser capacity is automatically available at any time increased condensation is required.

Other objects and features and the full nature of the invention will be understood from the accompanying drawings and the following description and claims:

Fig. 1 is a side elevation of a passenger-carrying steam vehicle illustrating in dotted lines the location of the propelling engines, the condensers and the connections therebetween. Fig. 2 is a top plan view of the vehicle illustrating the position of auxiliary condensers located on the roof. Fig. 3 is a sectional view of the roof condenser taken on line 3—3 of Fig. 2.

In the drawings the vehicle is shown provided with a main engine 10 located in substantially the center of the structure and having a driving connection with the rear or driving wheels 11. The main engine is connected by an exhaust steam line 12 with a main condenser 13 located at the front end of the vehicle. The condenser 13 is of the air cooled type and is normally of sufficient capacity to condense the steam exhausted from the main engine without raising an excessive back pressure. A water return pipe 14 leads from the lower side of the condenser 13 to the main water tank 15 located adjacent the engine 10. From the water tank the water is pumped to boilers located in the rear of the vehicle and not shown in the drawings.

For use on heavy grades or in warm weather or in other conditions where steam is exhausted from the main engine in excess of the amount which may be condensed by the condenser 13, a pair of condensers 16 are provided and located upon the roof of the vehicle. The exhaust steam line 12 is provided with a branch 17 leading to a pressure relief valve 18. The valve 18 is preferably of a spring loaded type adapted to prevent passage of steam so long as the pressure in the branch 17 is lower than a predetermined value. When the said pressure increases above a predetermined value, the valve 18 permits the passage of exhaust steam through a pair of pipe lines 19 to the condensers 16. The pipe lines 19 are carried within the wall of the vehicle in a "blind" panel 20 located between the entrance doors 21 and the first of the side windows 22. From the roof condensers 16 a pair of water return lines 23 lead to a cross connection 24 with the water return line 14. A branch 25 from the same cross connection 24 is connected to a pressure relief valve 26 which is set to relieve the pressure in the piping system by discharging water or steam to the atmosphere if the said pressure exceeds a safe value. The water return pipes 23 are carried in the wall of the vehicle in the blind panel 27 between the second window 28 and the third window 29.

The roof of the vehicles has the usual curved form as illustrated in cross section Fig. 3. The intake header 30 of each of the roof condensers is located adjacent the center line of the roof in the highest position. The drainage headers 31 of the roof condensers are connected to the water return lines 23 and are located at a distance from the center line and are, therefore, at a lower level than the intake headers 30. The condenser members 32 connecting the intake and drainage headers follow approximately the curvature of the roof. By this means proper drainage of the condensers is secured. The condenser tubes 32 are spaced from the roof sufficiently to allow circulation of air therebeneath for thorough cooling.

In a vehicle of this type the greatest amount of air in motion available for condensing purposes is found in the front of the machine in the position occupied by the condenser 13. The next greatest amount of air in motion is found in the position occupied by the roof condensers 16. By the arrangement of condensers herein described all of the condensation takes place in the condenser 13 located at the most advantageous position so long as the amount of exhaust steam is not greater than normal. When an extra load is thrown upon the main engines for any cause, the pressure in the exhaust steam line increases sufficiently to allow steam to blow through the valve 18 to the roof condensers 16 located in the second advantageous position.

While the foregoing specifications have been confined to the use of the invention with a passenger-carrying vehicle, it is to be understood that the invention is not to be limited thereto since it is applicable to any other type of steam driven vehicle.

The invention claimed is:

1. In a steam driven vehicle having a main propelling engine, a main condenser and an exhaust steam conduit conducting steam from said engine to said condenser, the combination of a secondary condenser, and means automatically operable to conduct exhaust steam from said engine to said secondary condenser when the steam exhausted from said engine is in excess of that condensible in said main condenser.

2. In a steam driven vehicle having a main propelling engine, the combination of a plurality of condensers, means for continuously connecting one of said condensers to receive exhaust steam from said engine, and means for automatically connecting the other of said condensers to receive exhaust steam from said engine when the steam exhausted from said engine is in excess of that condensible in said first mentioned condenser.

3. In a steam driven vehicle having a main propelling engine, a main condenser and an exhaust steam conduit conducting steam from said engine to said condenser, the combination of a secondary condenser, a pipe connection between said secondary condenser and said exhaust steam conduit, and a pressure relief valve in said pipe connection adapted to permit passage of steam therethrough when pressure in the said exhaust steam conduit is greater than a predetermined value.

4. In a steam driven vehicle having a main propelling engine, a main condenser and an exhaust steam conduit conducting steam from said engine to said condenser, the combination of a secondary condenser located on the roof of the vehicle, a pipe connection between said secondary condenser and said exhaust steam conduit, and a pressure relief valve in said pipe connection adapted to permit passage of steam therethrough when pressure in the said exhaust steam conduit is greater than a predetermined value.

5. In a steam driven vehicle having a main propelling engine, a main condenser, a water reservoir, an exhaust steam conduit conducting steam from said engine to said condenser, and windows and doors having blind panels therebetween, the combination of a secondary condenser located on the roof of said vehicle, a pipe connection between said secondary condenser and said exhaust steam conduit, a pressure relief valve in said pipe connection adapted to permit passage of steam therethrough when pressure in said exhaust steam conduit is greater than a predetermined value, and a drainage pipe connection from said secondary condenser to said water reservoir, said pipe connections to and from said secondary condenser passing through the walls of the said blind panels.

In witness whereof, I have hereunto affixed my signature.

D'ORSAY McCALL WHITE.